Patented Sept. 22, 1925.

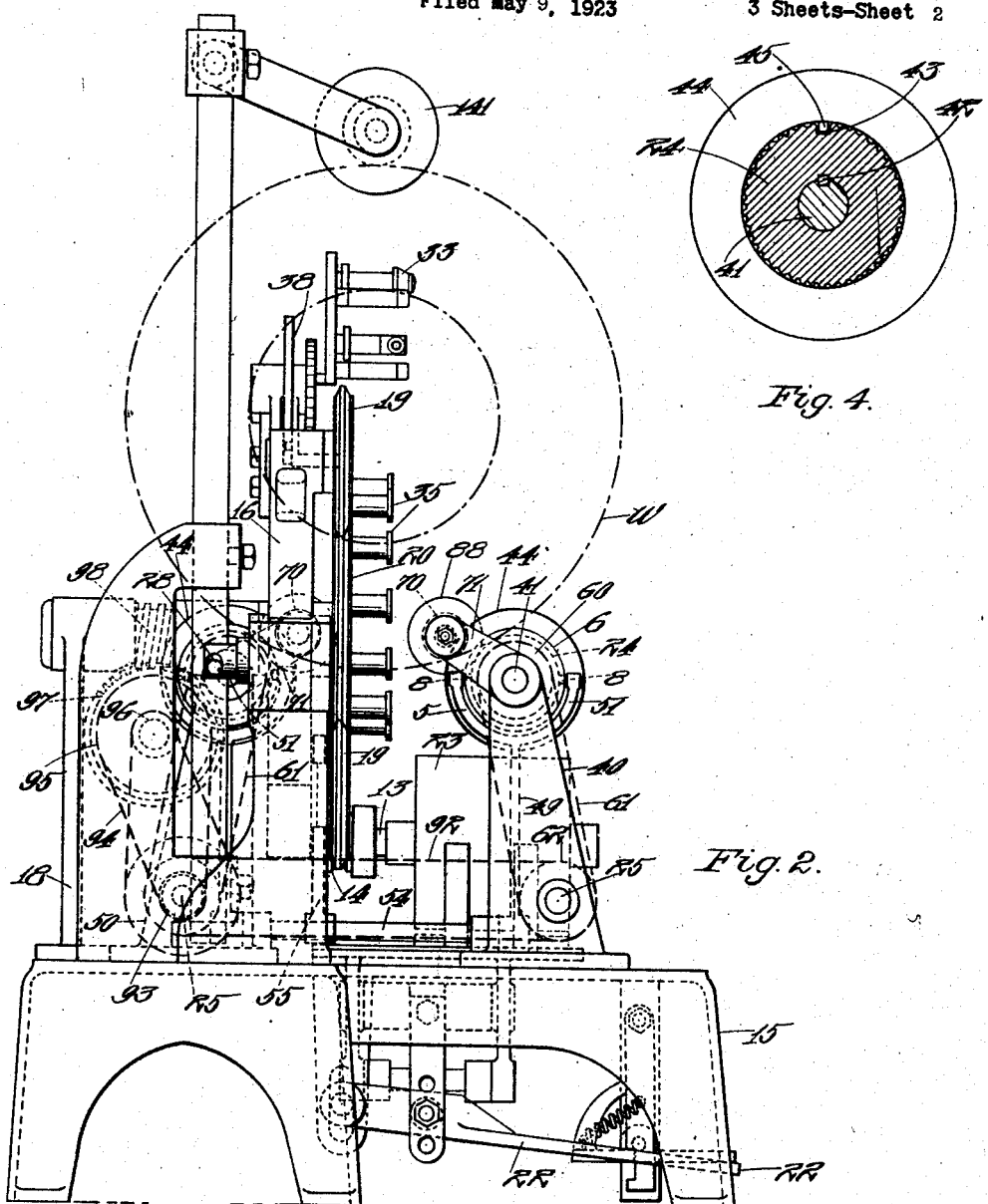

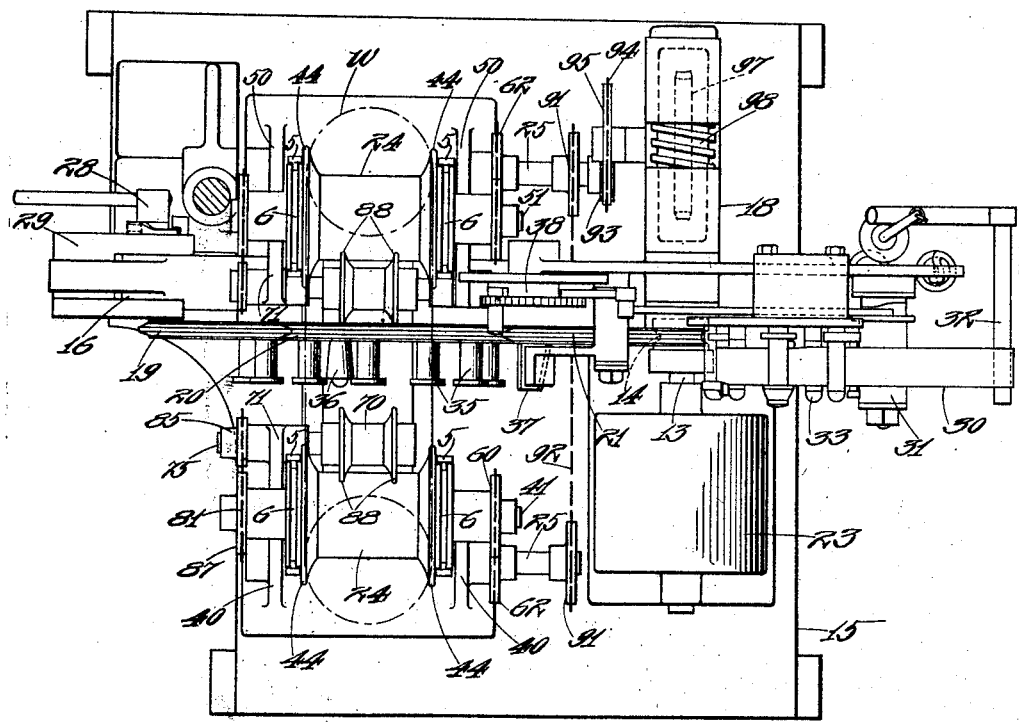

1,554,655

UNITED STATES PATENT OFFICE.

GEORGE W. PROUTY, OF BOSTON, MASSACHUSETTS.

WORK SUPPORT FOR WRAPPING MACHINES.

Application filed May 9, 1923. Serial No. 637,658.

*To all whom it may concern:*

Be it known that I, GEORGE W. PROUTY, a citizen of the United States, residing at Boston, in the county of Suffolk, State of Massachusetts, have invented a certain new and useful Improvement in Work Supports for Wrapping Machines, of which the following is a specification, reference being had therein to the accompanying drawings.

This invention relates to wrapping machines of the general type shown and described in my prior application for Letters Patent filed June 21, 1921, Serial No. 479,410, and adapted primarily for wrapping annular objects, such, for example, as automobile tires, coils of wire, etc.

The present invention has for its object to provide supports for the work to be operated upon, which consist of power driven rollers upon which the work rests and by which it is revolved. The rollers constituting my invention are provided with adjustable collars which can be simultaneously moved toward and from each other on the said rollers and caused to press against the sides of the various sizes of work to be wrapped. I have also provided auxiliary rollers adaptable for use in wrapping small articles and which can be conveniently attached and detached from the machine.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departure from its spirit and scope.

In said drawings:

Figs. 1 and 2 are front and side elevations respectively of the complete machine, showing in particular the construction constituting my present invention.

Fig. 3 is a plan view of the complete machine.

Fig. 4 is a sectional view of one of the large work supporting rollers, taken on the line 4—4 of Fig. 1.

Fig. 5 is an enlarged plan view of one of the auxiliary work supporting rollers and its associated parts.

Fig. 6 is a fragmentary view of an alternative means for operating the adjustable collars on the rollers.

Figure 1:
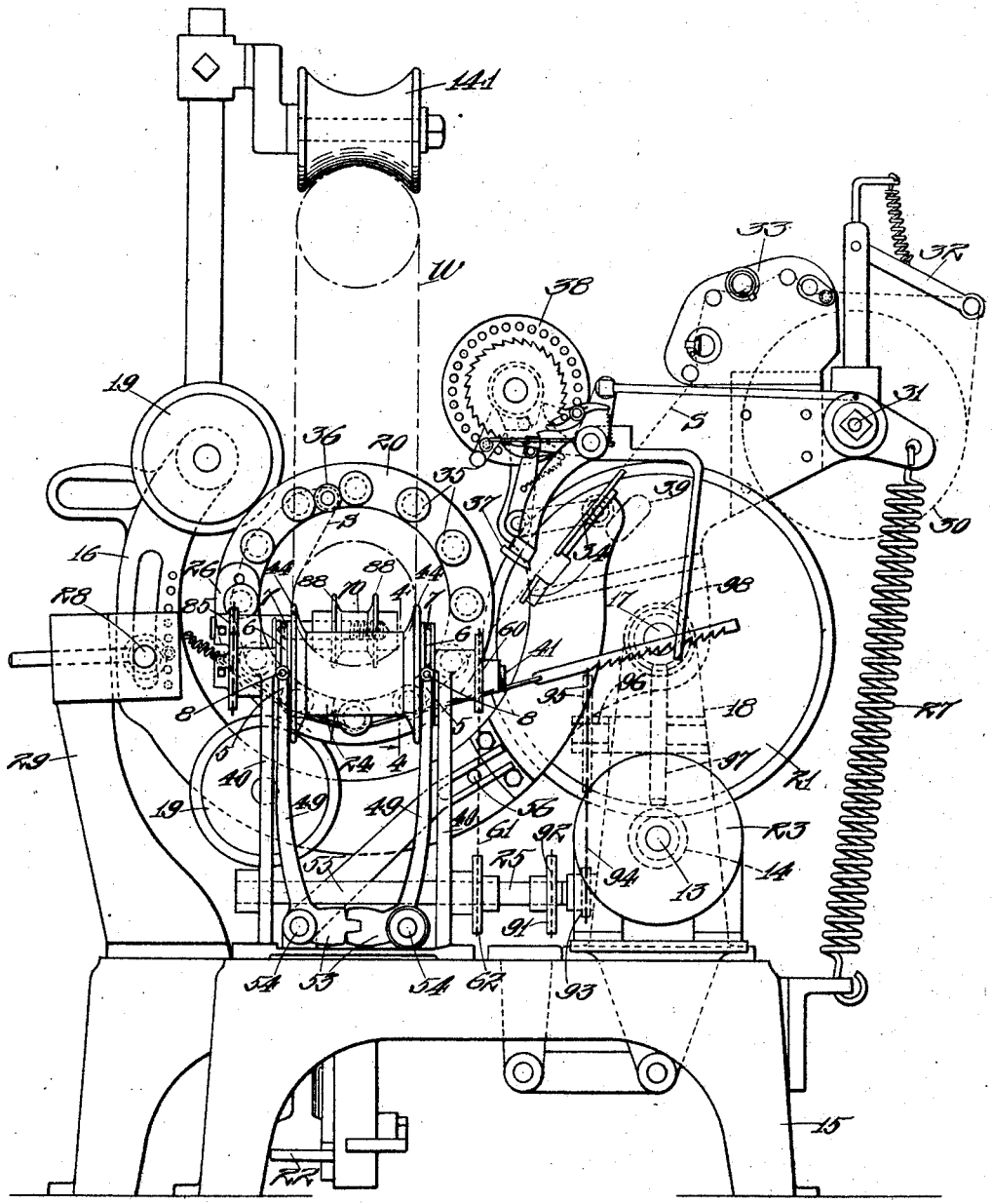

The frame of the machine comprises a base 15 and a yoke 16 which is pivotally mounted on a shaft 17 journalled in an upright 18 rising from the base 15. The yoke 16 is provided with guide rollers 19 for an annular shuttle 20 which is rotated by a driving member in the form of a friction disk 21 secured to the shaft 17 and driven by a friction disk 14 on the shaft 13 of an electric motor 23 which may be raised and lowered to engage and disengage said disks by a starting treadle 22. The tire or other work W to be wrapped is held by a weighted roller 141 upon the work supporting rollers 24 to which the present invention in part relates, and which are driven through connections hereinafter more fully described from the motor 23, the arrangement being such that the work W will be turned relatively slowly with respect to the speed of rotation of the shuttle 20. Said shuttle is formed with a hinged segment 26 normally closing a gap through which the work W may be inserted, while the yoke 16 may be adjusted about the axis of the shaft 17 to center the shuttle 20 with respect to annular objects of different sizes, said yoke being counterbalanced by a spring 27 and being locked in adjusted position by means of a clamp 28 carried by an upright 29 rising from the base 15.

The wrapping material, preferably in the form of a continuous strip S of paper, is supplied from a roll 30 supported by a reel or spindle 31 carried by the yoke 16. Said paper passes from the roll 30 over a tension device 32, thence through a folding device designated as a whole by the numeral 33, and thence over a guide plate 34 to the shuttle 20. Said shuttle 20 comprises an annulus having on one face a circular series of rollers 35 about which the strip S is wrapped when the shuttle is rotated, said strip being fed from the shuttle about a guide roller 36 to the work W. Between the shuttle 20 and the source of supply 30 there is provided a cutting mechanism comprising a knife 37 cooperating with a portion of the guide plate 34 to sever the strip S when a sufficient length thereof has been wound around the shuttle rollers 35 to complete the wrapping of the work W. The knife 37 is automatically actuated, after a predetermined number of rotations of the driving disk 21, by a counting mechanism 38 actuated at each rotation of said driving disk by a cam projection 39 thereon, said counting mechanism being manually adjustable in accordance with the size of the articles wrapped.

From the foregoing the nature, location, and function of the parts referred to will be sufficiently understood for the purpose of the present case. With the exception of those hereinafter described, and in so far as the others enter into combination therewith, as pointed out in the claims, these parts are not involved in the present invention and may be of any suitable construction and arrangement.

Rising from the base 15 of the machine are two pairs of parallel standards 40 and 50. As may be seen in Fig. 2, the standards 40 and 50 are located on opposite sides of the shuttle 20, the standards 50 being at the rear, and the standards 40 at the front of the machine. The standards 40 and 50 have journalled therein shafts 41 and 51, respectively, upon which the work supporting rollers 24 are mounted. The rollers 24 are corrugated on their peripheries, as shown in Fig. 4, and are keyed to the shafts 41 and 51 by keys 42 so as to rotate therewith. Each roller 24 has a groove 43 which extends longitudinally of the roller. Mounted on the rollers 24 are collars 44, said collars having splines 45 which slide in the grooves 43, thereby causing the collars 44 to rotate with the rollers 24 but leaving the said collars free to slide longitudinally of the rollers. Each collar 44 is provided with a circular flange 6 having an annular groove 7 on the periphery adapted to receive pins 8 carried by the forked upper ends 5 of the upright arms of the bell crank 49. In the operation of the machine it is desirable simultaneously to move the collars 44 equally toward and from each other so that the work W may be centered therebetween with respect to the shuttle and firmly pressed on its sides by the approaching faces of said collars. The bell cranks 49 are arranged in pairs, there being a pair corresponding to each roller 24. The corresponding bell cranks of the several pairs are carried by shafts 54 journalled in suitable bearings on the base, while the laterally extending arms 53 of the bell cranks of each pair are formed with interengaging parts constituting, in effect, intermeshing gear segments. This arrangement is such that when one of the bell cranks 48 is moved it will cause the remaining bell cranks to be moved an equal amount, the two bell cranks of each pair moving in opposite directions.

In my preferred construction, shown in Fig. 1, one of the shafts 54 is provided at its forward end with an arm 55 having an angular end which is longitudinally slotted to receive a pin 56 secured to and projecting from the yoke 16. When the yoke 16 is adjusted in accordance with the size of the work W in order to center the shuttle 20 with respect to said work, the pin 56 will cause the arm 55 to move a predetermined amount, thereby also adjusting the collars 44 on the rollers 24, in accordance with the size of the work. It will be understood that the pin 56 is located on the shuttle yoke 16 at a point which will cause the arm 55 to move the collars 44 the proper amount during the centering movement of said yoke.

In Fig. 6, I have shown an alternative construction for adjusting the collars 44 which consists of a hand lever 57 attached to one of the shafts 54, whereby the collars 44 may be adjusted manually. In operation, the work W is placed on the rollers 24, being held upright thereon by the weighted guide roller 141, and the operator then moves the lever 57 which in turn moves the collars 44 into the adjusted position. When the collars 44 have been pressed against the sides of the work, the lever 57 is locked by means of a spring catch 58 carried by the lever 57 and co-operating with a notched segment 59.

The rollers 24 are rotated by power transmitted from the motor 23 by the connections now to be described. The shafts 41 and 51 are provided with sprocket wheels 60 secured thereon. The sprocket wheels 60 are connected by chains 61 to sprocket wheels 62 secured to parallel shafts 25 provided with sprockets 91 connected by a chain 92 with each other. One of the shafts 25 is provided with a third sprocket 93 connected by a chain 94 with a sprocket 95 on a shaft 96 having bearings in the upright 18 and provided with a worm gear 97 which is driven by a worm 98 on the shaft 17.

In Fig. 5 I have shown an enlarged view of one of my auxiliary rollers 70 which constitute a part of this invention and which are adapted for use in wrapping small articles. The standards 40 are provided with extending arms 71, having journalled therein the short shafts 75, said shafts 75 being provided with enlargements 76 on their innermost ends. A threaded shaft 77 is screwed into the shaft 75 and secured thereto by a pin 78. The shafts 77 are screwed into the rollers 70, and both the shafts 77 and rollers 70 are slotted so as to provide openings for the insertion of pins 79 which cause the said parts to rotate together but permit the shafts 77 to be easily removed from the rollers 70. The rollers 70 have extensions 80 on one end of smaller diameter, which likewise are screwed into and pinned to shafts 75 in the enlargements 76. By the above construction, the small rollers 70 and their auxiliary parts can be conveniently placed on the machine and removed therefrom, it being understood that when the rollers 70, together with the extensions 80 and the shafts 77 are removed, sufficient space is left for large articles to be placed on the rollers 24. With respect to the roller 70 which is nearest the front of the machine, I have found it desirable in certain cases to provide but one supporting arm 71, the roller being supported thereon by a single shaft 75.

The small rollers 70 are rotated by means of chains 81 which connect the sprocket wheels 87 on the shafts 41 and 51 of the large rollers to the sprocket wheels 85 on the shafts 75 of the small rollers 70.

The rollers 70 are also provided with collars 88, slidable longitudinally on the said rollers, but caused to rotate therewith by reason of set screws 89 screwed in the collars 88 and extending into the grooves 90 in the rollers 70. By means of the above construction the collars 88 can be adjusted to fit various sizes of the small articles to be wrapped.

Certain features shown and referred to herein are covered by claims of other applications for Letters Patent as follows:—

As to the machine as a whole, application Ser. No. 479,410, above referred to;

As to the driving mechanism, application Ser. No. 637,655 filed May 9, 1923, by Jasper Derry, Philip O. Tengberg and myself;

As to the paper folder, Serial No. 637,656 filed May 9, 1923, by Jasper Derry and myself; and As to the means for supporting and adjusting the shuttle-carrying yoke, Serial No. 637,657 filed May 9, 1923, by Jasper Derry and myself.

Having thus described my invention, I claim:

1. In a machine of the class described, a rotatable shuttle through which the work is adapted to be moved, an adjustable yoke for supporting said shuttle and adapted to be moved to center the shuttle with respect to the work, a plurality of rotatable rollers for supporting and moving the work, longitudinally slidable collars on said rollers, said collars being secured to said rollers so as to revolve therewith, and means operated by said adjustable yoke for moving said collars toward and from each other when said yoke is adjusted.

2. In a machine of the class described, wrapping mechanism adjustable for different sizes of work, rotatable rollers for supporting the work to be wrapped, longitudinally slidable collars on said rollers, and means operated by the adjustment of said wrapping mechanism for adjusting said collars with respect to the work.

3. In a machine of the class described, wrapping mechanism adjustable to different sizes of work, rotatable rollers for supporting the work to be wrapped, longitudinally slidable collars on said rollers, and means operated by the adjustment of said wrapping mechanism for simultaneously moving said collars toward and from each other.

4. In a machine of the class described, a rotatable shuttle, an adjustable shuttle supporting yoke, a plurality of rotatable rollers for supporting the work to be wrapped, longitudinally slidable collars on said rollers, and means operated by said yoke for adjusting said collars with respect to the work.

5. In a machine of the class described, a rotatable shuttle, an adjustable shuttle supporting yoke, a plurality of rotatable work supporting rollers, longitudinally slidable collars on said rollers, and means operated by said yoke for simultaneously moving said collars toward and from each other.

6. In a machine of the class described, wrapping mechanism adjustable for different sizes of work, rotatable rollers for supporting the work to be wrapped, longitudinally slidable collars on said rollers, co-operating bell cranks for adjusting said collars, and a lever operated by the adjustment of said wrapping mechanism for operating said bell cranks to move said collars toward and from each other.

7. A machine of the class described provided with a plurality of main work supporting rollers for large articles to be wrapped and a plurality of auxiliary rollers for supporting small articles.

8. A machine of the class described provided with a plurality of main work supporting rollers for large articles and a plurality of demountable, auxiliary rollers for supporting small articles to be wrapped.

9. A machine of the class described having a plurality of main work supporting rollers for large articles to be wrapped and a plurality of auxiliary rollers for supporting small articles, all of said rollers having longitudinally slidable and adjustable collars thereon adapted to contact with the work to be wrapped.

10. In a machine of the class described, in combination with a plurality of work supporting rollers, a pair of auxiliary rollers for supporting small articles to be wrapped, and means for rotating all of said rollers.

In testimony whereof I affix my signature.

GEORGE W. PROUTY.